Oct. 7, 1958  E. W. MOLLOHAN  2,854,805
CHISEL OR SICKLE TYPE LAWN EDGER
Filed Oct. 1, 1956  2 Sheets-Sheet 1

INVENTOR.
Eugene W. Mollohan
BY Victor J. Evans & Co.
ATTORNEYS

Oct. 7, 1958
E. W. MOLLOHAN
2,854,805
CHISEL OR SICKLE TYPE LAWN EDGER
Filed Oct. 1, 1956
2 Sheets-Sheet 2
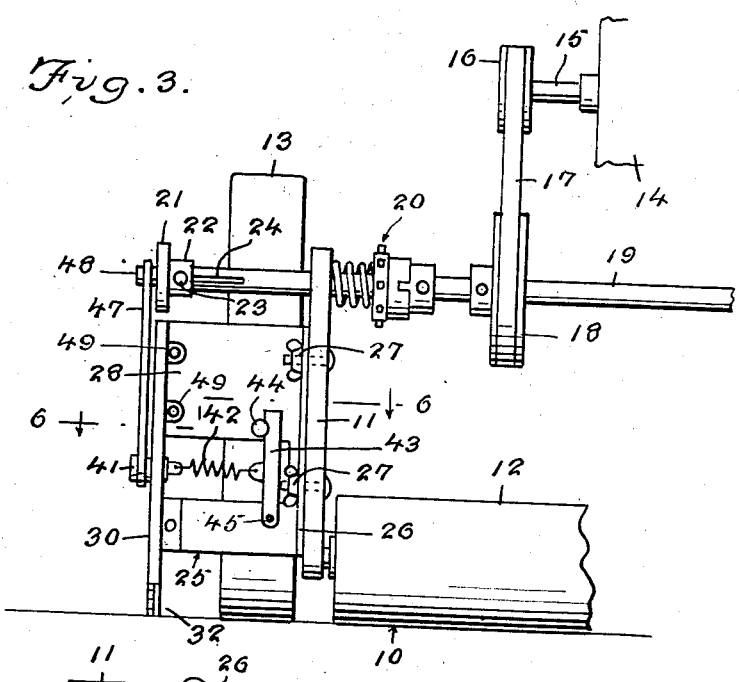
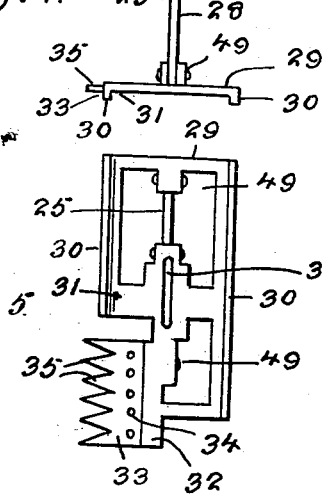
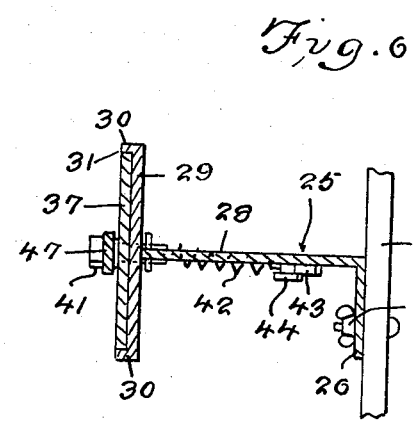
INVENTOR.
Eugene W. Mollohan
BY Victor J. Evans & Co.
ATTORNEYS

United States Patent Office 2,854,805
Patented Oct. 7, 1958

2,854,805

CHISEL OR SICKLE TYPE LAWN EDGER

Eugene W. Mollohan, Wichita, Kans.

Application October 1, 1956, Serial No. 613,292

3 Claims. (Cl. 56—26.5)

This invention relates to a lawn mower, and more particularly to a chisel or sickle type lawn edger for a lawn mower.

The object of the invention is to provide an edger which is adapted to be mounted on a lawn mower and driven by the power source of the lawn mower.

A still further object of the invention is to provide a lawn edger for a lawn mower wherein the edger comprises a stationary blade and an adjustable moving blade which are adapted to coact so that the edger can be used for effectively cutting grass or the like, the edger including a reversible blade whereby the edger can be used to accomplish different cutting effects.

A still further object of the invention is to provide a lawn mower edger wherein a power take-off shaft of the lawn mower is used to operate a lawn edger, the lawn edger including a blade or cutting member which is adapted to be reciprocated by the power take-off shaft so that the lawn edger can be used for facilitating the job of trimming around walks, curbs, driveways, flower beds and other areas.

The invention also comprises certain other novel constructions, combinations, and arrangement of parts as subsequently specified and claimed.

In the accompanying drawings:

Figure 3 is a fragmentary rear elevational view illustrating the lawn edger of the present invention.

Figure 4 is a plan view illustrating the body member.

Figure 5 is a view taken at right angles to the view shown in Figure 4.

Figure 6 is a sectional view taken on the line 6—6 of Figure 3.

Figure 1:
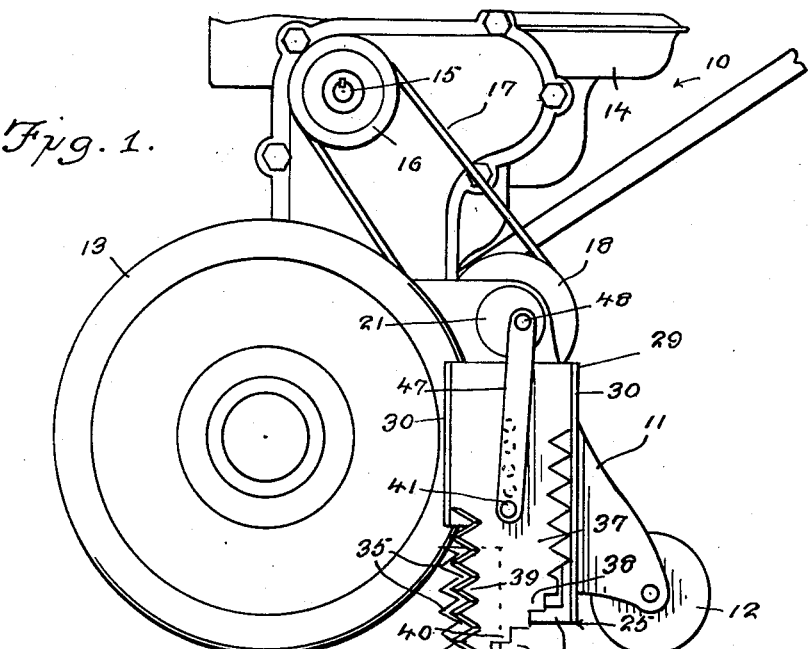
Figure 1 is a side elevational view illustrating the lawn edger mounted on a lawn mower, according to the present invention.

Referring in detail to the drawings, the numeral 10 indicates a portion of a lawn mower which includes a frame that consists of at least one side plate 11. There is further provided the usual ground engaging roller 12 and the ground engaging wheels 13. The numeral 14 designates the power source which is mounted on the lawn mower, and the power source 14 may be a gasoline engine or electric motor. Driven by the engine 14 is a first shaft 15 which has a pulley 16 mounted thereon, and an endless belt 17 is trained over the pulley 16, the belt 17 being trained over a pulley 18. The pulley 18 is mounted on a power take-off or second shaft 19, and the construction of the shaft 19 is more fully described in my copending application. A clutch 20 as described in my copending application is arranged on the shaft 19.

The present invention is directed to an edger, and the edger of the present invention includes a disc 21 which is mounted on an end of the shaft 19. A collar 22 is secured to the disc 21 or formed integral therewith, and the collar 22 has a set screw 23 extending there- through and into engagement with a slot keyway 24 in the end of the shaft 19.

There is further provided a body member which is indicated generally by the numeral 25. The body member 25 includes a flange 26 which is arranged contiguous to the outer surface of the plate 11. The flange 26 is connected to the plate 11 through the medium of suitable securing elements such as bolt and nut assemblies 27, Figures 3, 4 and 6. Arranged at right angles with respect to the flange 26 and secured thereto or formed integral therewith is a vertically disposed plate 28, and a base 29 is arranged at right angles with respect to the plate 28 and is secured thereto. The base 29 is provided with a pair of spaced parallel lips 30 which define therebetween a trackway 31 for a purpose to be later described. The lower portion of the base 29 defines a support member 32, and a blade 33 is connected to the support member 32 through the medium of suitable securing elements such as screws 34. The blade 33 is provided with a plurality of spaced apart teeth 35, Figure 5. The base 29 is further provided with an elongated slot 36, Figure 5, for a purpose to be later described.

Mounted for sliding movement in the trackway 31 of the base 29, is a movable blade 37. The blade 37 is provided with teeth 38 and 39 which are arranged on opposite sides of the blade 37, and the teeth 38 and 39 are arranged adjacent the lower portion of the blade. The lower end of the blade 37 is cut away at an angle, and the angular beveled lower portion of the blade 37 is provided with a plurality of spaced apart teeth 40, Figures 1 and 2.

A pin 41 extends through the lower end of an arm 47, and through one of a plurality of apertures or openings 46 in the blade 37. The pin 41 further extends through the slot 36 in the base 29, and a coil spring 42 has one end connected to the pin 41. The other end of the coil spring 42 is connected to a finger 43 which has its lower end pivotally connected to the plate 28 by means of a pin 45, the upper end of the finger 43 being arranged in engagement with a pin or bolt 44, Figures 3 and 6. An eccentric pin 48 connects the upper end of the arm 47 to the disc 21, and the pin 48 is arranged offset with respect to the center of the disc 21.

Figure 2:
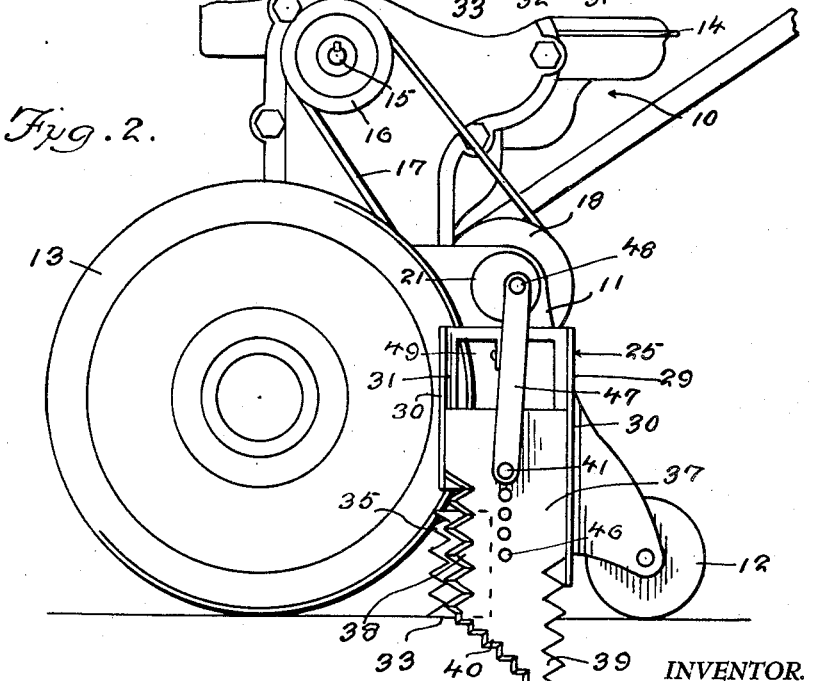
Figure 2 is a view similar to Figure 1 but showing the blade reversed.

From the foregoing, it is apparent that there has been provided an edger for use with a lawn mower such as the lawn mower 10. In use, with the parts arranged as shown in the drawings, actuation of the motor 14 causes rotation of the shaft 15 and this in turn drives the belt 17 which in turn results in rotation of the shaft 19. The clutch 20 is mounted on the shaft 19, and due to the provision of the clutch 20, the shaft 19 can be permitted to rotate with or without operating the wheels 13 or driving the reel of the lawn mower. The disc 21 is secured to the end of the shaft 19 through the medium of the set screw 23 so that as the shaft 19 rotates, it rotates the disc 21 and this in turn causes movement of the arm 47 due to the provision of the offset or eccentric pin 48. This movement of the arm 47 results in up and down or sliding movement of the blade 37, since the pin 41 connects the lower end of the arm 47 to the blade 37. As the blade 37 moves up and down, the teeth of the blade coact with the teeth 35 of the blade 33 so that the grass will be severed or cut whereby the edging operation is carried out. The pin 41 extends through the arm 47, and through one of the openings 46, and through the slot 36, and the coil spring 42 has one end connected to the pin 41, while the other end of the coil spring 42 is connected to the finger 43. The body member 25 has its flange 26 secured to the side plate 11 of the lawn mower frame by means of the bolt and nut assemblies 27. The trackway 31 in the base 29 provides a guide for the moving blade 37. With the blade 37 arranged as shown in Figure 1, the teeth 39 coact with the teeth 35 to cut the grass. With the blade 37 reversed and arranged as shown in Figure 2, the teeth 38 and the teeth 35 coact to cut the grass or perform the edging operation. Since the shaft 19 is continually rotating, the blade 37 will be continuously moved up and down so that the continuous edging operation is accomplished.

In the edger of the present invention, the only moving parts are the blade 37, arm 47 and the off center wheel or disc 21 which is arranged on the power take-off shaft 19. While the present invention illustrates the edger mounted on a reel type lawn mover, it is to be understood that the edger can be used on a rotary type mower if desired. Furthermore, the edger can be readily removed or installed when desired.

The disc 21 is mounted on an end of the shaft 19 and is held in place by means of the set screw 23. The arm 47 drives the cutting blade 37 and in Figure 1, the blade 37 is set so that it has sickle action only and is trimming at ground level as around driveways and side walls. The cutting teeth 39 on the left side of the blade in Figure 1, are sharpened by a bevel which leaves the inside of the blade 37 flat so that the flat surface can slide across the stationary blade 33. The blade 37 is provided with a plurality of openings or holes 46 so that the depth of cut can be increased or changed as desired. The base 29 is provided with the trackway 31 which holds the blade 37 and guides the blade during its movement.

In Figure 2, the cutting blade 37 has been turned over or reversed and connected to the arm 47 at the top hole 46 which permits the greatest depth to be cut. In the position shown in Figure 2, the blade 37 has sickle action at and above the ground level and has chisel action below the ground level. The blade 37 would be used in the Figure 2 position when trimming around flower beds, trees, curbs or the like, and the sharpening bevel in the Figure 2 position is again from outside to inside in order to insure that the blade 37 has a flat surface contiguous to the stationary blade 33.

The body member 25 is fastened to the side plate 11 of the mower. Due to the provision of the spring 42 and its associated parts, the depth of cut can be changed since the blade 37 can be moved or turned over. Furthermore, the spring 42 maintains the proper contact between the moving blade 37 and the stationary blade 33. The pin 41 passes through the slot 36 and suitable washers may be arranged on this pin. Tension on the coil spring 42 can be released by unhooking the finger 43 from the bolt 44 and then permitting the finger 43 to pivot on the pin 45, then by unhooking the end of spring 42 from hole in end of pin 41 the operator can remove pin 41 and is able to change depth of cut by changing to a different hole 46 or is able to reverse blade to arrive at either chisel or sickle action in cutting. The base 29 may be secured to the plate 28 through the medium of suitable securing elements such as rivets 49. The slot 36 provides sufficient clearance for the moving pin 41. The blade 33 can be detached by removing the securing elements 34 so that by moving the blade 33 up or down on the support member 32, the depth of cut can be changed or varied.

While this invention is shown in relation to or as an accessory on a reel type power mower it is understood that this edger in its present form and principle could also be used as an edger on either a rotary type power mower or on a manually powered reel type mower as well as the reel type power mower.

I claim:

1. In a lawn mower, a frame including at least one side plate, ground engaging wheels journaled in said frame, a power source on said frame, a first shaft driven by said power source, a pulley on said first shaft, a second shaft spaced from said first shaft and journaled in said side plate and extending beyond said frame, an edger comprising a disc arranged on an end of said second shaft and secured thereto, a body member including a flange arranged contiguous to the outer surface of said side plate and secured thereto, a vertically disposed plate arranged at right angles to said flange and extending outwardly therefrom, a base arranged at right angles to the outer end of said plate and secured thereto, a pair of spaced parallel vertically disposed lips extending outwardly from the side edges of said base and defining in said base a trackway, there being a slot in the intermediate portion of said base, a support member on the lower end of said base, a stationary blade detachably connected to said support member and provided with a plurality of spaced apart teeth, a movable blade slidably mounted in said trackway and provided with a plurality of teeth on each side thereof adjacent the lower end thereof, the lower portion of said movable blade being cut away at an angle and being provided with a plurality of spaced apart teeth, there being a plurality of spaced apart apertures in said movable blade, an arm having its upper end connected to said disc and arranged off center with respect thereto, a pin connected to the lower end of said arm and extending through one of the apertures in said movable blade and through the slot in said base, a finger connected to said plate, and a coil spring having one end connected to said finger and its other end connected to said pin.

2. In an edger for a lawn mower, a rotary disc, a body member including a flange, a vertically disposed plate arranged at right angles to said flange and extending outwardly therefrom, a base arranged at right angles to the outer end of said plate and secured thereto, a pair of spaced parallel vertically disposed lips extending outwardly from the side edges of said base and defining in said base a trackway, there being a slot in the intermediate portion of said base, a support member on the lower end of said base, a stationary blade detachably connected to said support member, and provided with a plurailty of spaced apart teeth, a movable blade slidably mounted in said trackway and provided with a plurality of teeth on each side thereof, the lower portion of said movable blade being cut away at an angle and being provided with a plurality of spaced apart teeth, there being a plurality of spaced apart apertures in said movable blade, an arm having its upper end connected to said disc and arranged offset from center with respect thereto, a pin connected to the lower end of said arm and extending through one of the apertures in said movable blade and through the slot in said base, a finger pivotally connected to said plate, and resilient means extending between said finger and said pin.

3. The structure as defined in claim 2 wherein said resilient means comprises a coil spring.

References Cited in the file of this patent
UNITED STATES PATENTS

| | | |
|---|---|---|
| 2,188,961 | Scofield | Feb. 6, 1940 |
| 2,269,007 | Clark | Jan. 6, 1942 |
| 2,643,502 | Flanigan | June 30, 1953 |
| 2,778,183 | Evans | Jan. 22, 1957 |